United States Patent
Huang et al.

(10) Patent No.: US 10,457,837 B2
(45) Date of Patent: Oct. 29, 2019

(54) COATING COMPOSITION AND METHOD OF PREPARING THE SAME

(71) Applicant: INDUSTRIAL TECHNOLOGY RESEARCH INSTITUTE, Hsinchu (TW)

(72) Inventors: Yuan-Chang Huang, Hsinchu (TW); Ya-I Hsu, Taoyuan (TW); Yi-Che Su, Zhubei (TW); Wei-Cheng Tang, Hsinchu (TW); Shu-Yun Chien, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 99 days.

(21) Appl. No.: 15/855,268

(22) Filed: Dec. 27, 2017

(65) Prior Publication Data

US 2018/0179416 A1    Jun. 28, 2018

(30) Foreign Application Priority Data

Dec. 28, 2016    (TW) .............................. 105143529 A

(51) Int. Cl.
| C09D 183/10 | (2006.01) |
| C08G 81/00 | (2006.01) |
| C08G 77/445 | (2006.01) |

(52) U.S. Cl.
CPC ......... *C09D 183/10* (2013.01); *C08G 77/445* (2013.01); *C08G 81/00* (2013.01)

(58) Field of Classification Search
CPC .. C09D 183/10; C08G 77/445; C08G 77/442; C08G 77/458
See application file for complete search history.

(56) References Cited

U.S. PATENT DOCUMENTS

| 6,916,543 | B2 * | 7/2005 | De ........................ C08F 220/30 428/447 |
| 2011/0160330 | A1 | 6/2011 | Nagai et al. | |
| 2014/0243452 | A1 | 8/2014 | Smetana | |

FOREIGN PATENT DOCUMENTS

| CN | 102131819 A | 7/2011 |
| CN | 102782065 A | 11/2012 |
| CN | 103113812 A | 5/2013 |
| CN | 102977253 B | 2/2015 |
| EP | 2540786 A1 | 1/2013 |
| JP | 2008-150611 A | 7/2008 |
| JP | 5688973 B2 | 3/2015 |
| KR | 10-2012-0131188 A | 12/2012 |
| KR | 10-2015-0122597 A | 11/2015 |
| KR | 10-1611935 B1 | 4/2016 |
| TW | 200617603 A | 6/2006 |
| TW | 201016712 A1 | 5/2010 |
| TW | 201141970 A1 | 12/2011 |
| TW | 201425498 A | 7/2014 |
| TW | I490254 B | 7/2015 |
| TW | 201540784 A | 11/2015 |
| TW | I506099 B | 11/2015 |
| TW | 201617603 A | 5/2016 |
| TW | I598416 B | 9/2017 |
| WO | WO 2010/024119 A1 | 3/2010 |
| WO | WO 2011/105401 A1 | 9/2011 |
| WO | WO 2013/019752 A1 | 2/2013 |
| WO | WO 2015/163681 A1 | 10/2015 |

OTHER PUBLICATIONS

Akbari et al., "Preparation and Characterization of Novel Hybrid Nanocomposites by Free Radical Copolymerization of Vinyl pyrrolidone with Incompletely Condensed Polyhedral Oligomeric Silsesquioxane," J Inorg Organomet Polym, published online Feb. 15, 2016, pp. 536-544 (9 pages total).

Fina et al., "POSS-based hybrids by melt/reactive blending," J. Mater. Chem, vol. 20, Jul. 8, 2010, pp. 9297-9305.

Han et al., "Control of thermal degradation of poly(lactic acid) using functional polysilsesquioxane microspheres as chain extenders," J. Appl. Polym. Sci., 2015, vol. 132, pp. 41977 (1 to 11).

He et al., "Preparation of a Siloxane Acrylic Functional Siloxane Colloid for UV-Curable Organic-Inorganic Hybrid Films," Macromol. Chem. Phys., vol. 206, 2005, pp. 732-743.

Jung et al., "Synthesis of acetoxyphenyl- and hydroxyphenyl-terminated polyfunctional T8, T10, T12 silsesquioxanes and initial studies on their use in the formation of highly crosslinked polyesters," Appl. Organometal, Chem., vol. 27, 2013, pp. 666-672.

Li et al., "Photoluminescent Eu3+/Tb3+ hybrids from the copolymerization of organically modified silane," Colloid. Polym. Sci., vol. 290, 2012 (published online Jul. 3, 2012), pp. 1765-1775.

(Continued)

*Primary Examiner* — Kuo Liang Peng
(74) *Attorney, Agent, or Firm* — Birch, Stewart, Kolasch & Birch, LLP

(57) ABSTRACT

The embodiments of the present disclosure provide a coating composition, including: polysilsesquioxane polymer modified organic resin represented by Formula (1):

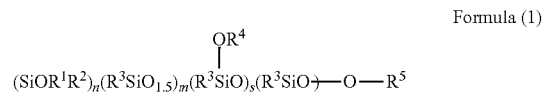

Formula (1)

Wherein, $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group; $R^2$ is half oxygen($O_{1/2}$), hydroxyl group, $C_{1-8}$ alkyl group, or $C_{1-8}$ alkoxy group; $R^3$ is halide group, $C_{1-8}$ alkyl halide group, $C_{1-8}$ alkoxy group, $C_{1-12}$ alkyl group, or $C_{5-20}$ aromatic ring; $R^4$ is hydrogen or $C_{1-8}$ alkyl group; $R^5$ is modified or unmodified carbonyl compound moiety; n is a positive integer from 1 to 200; m is a positive integer from 10 to 500, and s is an integer from 0 to 250.

10 Claims, 1 Drawing Sheet

(56) References Cited

OTHER PUBLICATIONS

Pathak et al., "Investigation of anti-corrosion behavior of waterborne organosilane—polyester coatings for AA6011 aluminum alloy," Elsevier, Progress in Organic Coatings, 2009, vol. 65, pp. 288-294.
Taiwanese Office Action and Search Report, dated Apr. 24, 2017, for Taiwanese Application No. 105143529.
Zhong et al., "Fabrication and characterization of chemically bonded polysilsesquioxane-polyacrylate hybrid latex particles," Composite Interfaces, vol. 21, No, 5, 2014 (published online Jan. 15, 2014), pp. 455-465 (12 pages total).

* cited by examiner

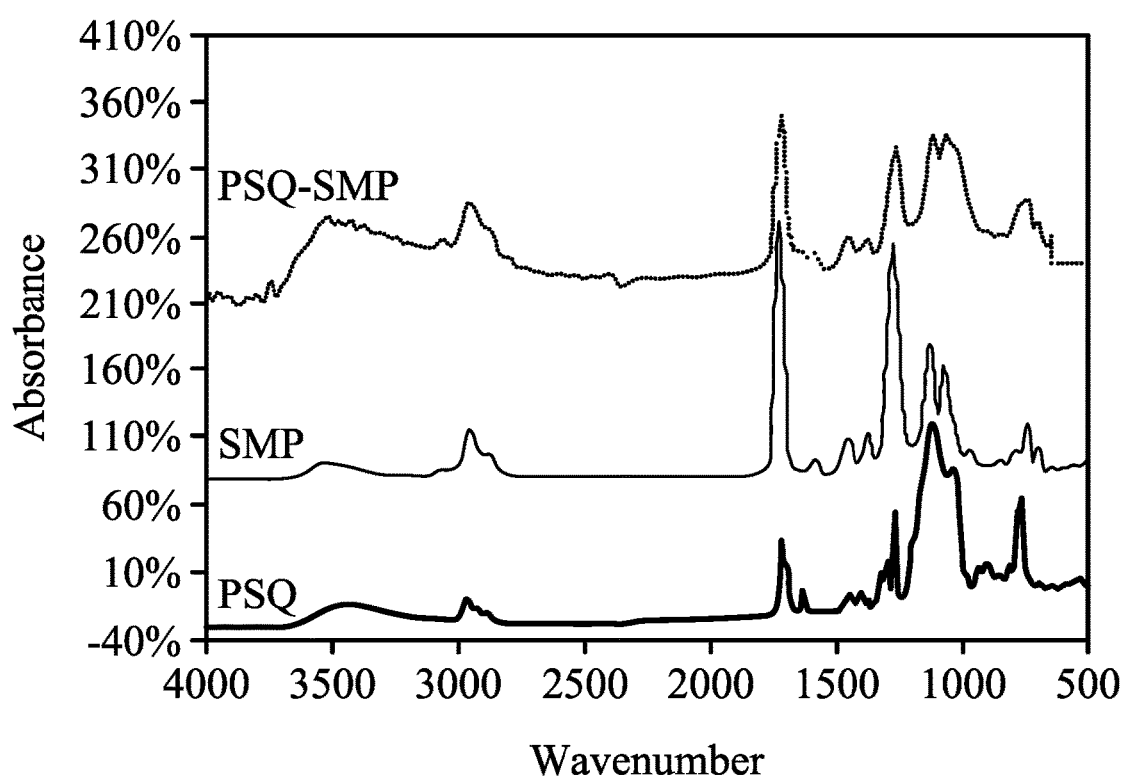

COATING COMPOSITION AND METHOD OF PREPARING THE SAME

CROSS REFERENCE TO RELATED APPLICATIONS

This Application claims priority of Taiwan Patent Application No. 105143529, filed on Dec. 28, 2016, the entirety of which is incorporated by reference herein.

BACKGROUND

Technical Field

The disclosure relates to a coating composition and a method of preparing the same.

Description of the Related Art

Organic polymeric materials are widely used in coating materials and optoelectronic products because of their lightness, thinness and flexibility. However, organic materials are poor in weatherability due to the low bond energy between atoms. Although inorganic materials have a high weatherability which may resist ultraviolet ray damage in sunlight, inorganic materials have poor film formability and flexibility, which may cause the film layer to be prone to peeling off.

Therefore, a coating composition with high film formability is required in the industry so as to form a film layer having high weatherability, high flexibility, and high mechanical strength.

BRIEF SUMMARY

The embodiments of the present disclosure provide a coating composition, including: polysilsesquioxane polymer modified organic resin represented by Formula (1):

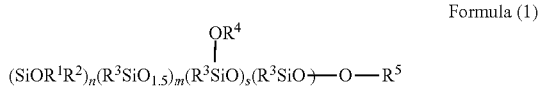

Formula (1)

Wherein, $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group; $R^2$ is half oxygen($O_{1/2}$), hydroxyl group, $C_{1-8}$ alkyl group, or $C_{1-8}$ alkoxy group; $R^3$ is halide group, $C_{1-8}$ alkyl halide group, $C_{1-8}$ alkoxy group, $C_{1-12}$ alkyl group, or $C_{5-20}$ aromatic ring; $R^4$ is hydrogen or $C_{1-8}$ alkyl group; $R^5$ is modified or unmodified carbonyl compound moiety; n is a positive integer from 1 to 200; m is a positive integer from 10 to 500, and s is an integer from 0 to 250.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 is a FT-IR spectrum of a polysilsesquioxane polymer, a silicon modified polyester resin and a polysilsesquioxane polymer modified silicon modified polyester resin in accordance with some embodiments of the disclosure.

DETAILED DESCRIPTION

The coating composition of the present disclosure and the method for preparing this coating composition are described in detail in the following description. In the following detailed description, for purposes of explanation, numerous specific details and embodiments are set forth in order to provide a thorough understanding of the present disclosure. It will be apparent, however, that the exemplary embodiments set forth herein are used merely for the purpose of illustration, and the inventive concept may be embodied in various forms without being limited to those exemplary embodiments.

The terms "about" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various components, these components should not be limited by these terms. These terms are only used to distinguish one component from another. Thus, a first component discussed below could be termed a second component without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills and the background or the context of the present disclosure, and should not be interpreted in an idealized or overly formal manner unless so defined.

Some embodiments of the present disclosure provide a coating composition, including: a polysilsesquioxane polymer modified organic resin (PSQ polymer modified organic resin) represented by Formula (1).

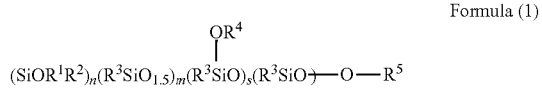

Formula (1)

In Formula (1), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. $R^5$ is modified or unmodified carbonyl compound moiety. In some embodiments of the present disclosure, $R^5$ includes a polyester resin moiety, a silicon modified polyester resin moiety, a polyurethane resin moiety, or an acrylic resin moiety. n is a positive integer from 1 to 200, for example, a positive integer from 20 to 50. m is a positive integer from 10 to 500, for example, a positive integer from 50 to 400. s is an integer from 0 to 250, for example, an integer from 10 to 50.

Specifically, the polysilsesquioxane polymer modified organic resin represented by Formula (1) includes a linking moiety represented by Formula (2):

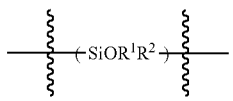

Formula (2)

In some embodiments of the present disclosure, each of the linking moieties represented by Formula (2) is covalently linked to two polysilsesquioxane moieties, and the linking moiety is covalently linked by its silicon atom to the oxygen atom of the polysilsesquioxane moiety.

In the above Formula (1), n represents the number of the linking moiety represented by Formula (2). When n is 1, it indicates that two polysilsesquioxane moieties are polymerized by one linking moiety represented by Formula (2). The polysilsesquioxane polymer modified organic resin of the embodiments of the present disclosure has the structure represented by Formula (3):

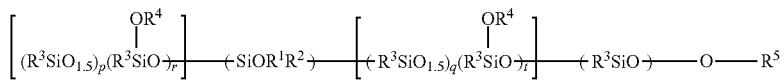

Formula (3)

In Formula (3), each p and q is independently a positive integer from 5 to 400, for example, a positive integer from 100 to 250, and the sum of p and q is m (i.e., p+q=m). Each t and r is independently an integer from 0 to 250, for example, an integer from 10 to 50, and the sum of t and r is s ((i.e., t+r=s).

In some embodiments of the present disclosure, when n is 2, it indicates that three polysilsesquioxane moieties are polymerized by two linking moieties represented by Formula (2). The polysilsesquioxane polymer modified organic resin of the embodiments of the present disclosure has the structure represented by Formula (4):

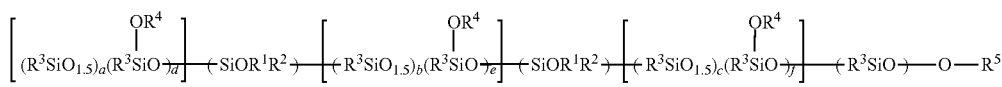

Formula (4)

In Formula (4), each a, b and c is independently a positive integer from 5 to 400, for example, a positive integer from 100 to 250, and the sum of a, b and c is m (i.e., a+b+c=m). Each d, e and f is independently an integer from 0 to 250, for example, an integer from 10 to 50, and the sum of d, e and f is s (i.e., d+e+f=s).

Furthermore, when n is from 20 to 50, the structure of the polysilsesquioxane polymer modified organic resin in the embodiments of the present disclosure may be deduced by analogy, and the details are not described herein again.

In some embodiments of the present disclosure, the modified or unmodified carbonyl compound moiety $R^5$ is a polyester resin moiety represented by Formula (5).

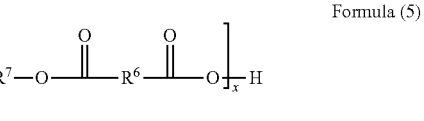

Formula (5)

In Formula (5), $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000.

Additionally, in this embodiment, the polysilsesquioxane polymer modified organic resin has the structure represented by Formula (6).

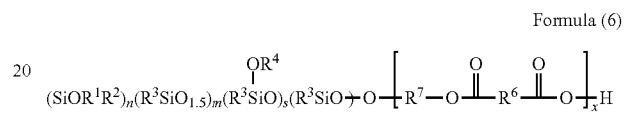

Formula (6)

In Formula (6), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. n is a positive integer from 1 to 200, for example, a positive integer from 20 to 50. m is a positive integer from 10 to 500, for example, a positive integer from 50 to 400. s is an integer from 0 to 250, for example, a integer from 10 to 50. $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000.

In some embodiments of the present disclosure, the modified or unmodified carbonyl compound moiety $R^5$ is a silicon modified polyester resin moiety represented by Formula (7).

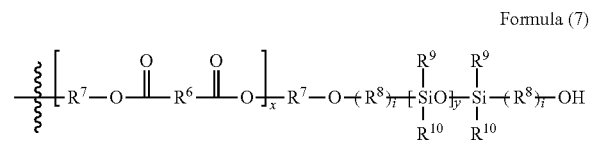

Formula (7)

In Formula (7), $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000. $R^8$ is $C_{1-20}$ alkylene group or $C_{1-20}$ oxyalkylene group. i is in a range from 0 to 10, for example, from 0 to 5. $R^9$ and $R^{10}$ may be the same or different, and each $R^9$ and $R^{10}$ is independently $C_{1-20}$ alkyl group or $C_{6-20}$ aryl group. y is a positive integer from 1 to 4,000, for example, a positive integer from 100 to 2,000. When i is 0, $R^7$ is linked to the silicon atom by its oxygen atom, and is linked to the oxygen atom of another moiety (for example, a hydroxyl group) by its carbon atom.

Additionally, in this embodiment, the polysilsesquioxane polymer modified organic resin has the structure represented by Formula (8).

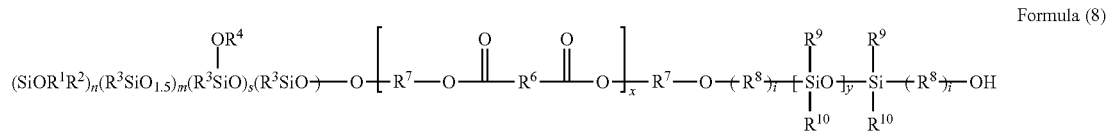

Formula (8)

In Formula (8), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. n is a positive integer from 1 to 200, for example, a positive integer from 20 to 50. m is a positive integer from 10 to 500, for example, a positive integer from 50 to 400. s is an integer from 0 to 250, for example, a integer from 10 to 50. $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000. $R^8$ is $C_{1-20}$ alkylene group or $C_{1-20}$ oxyalkylene group. i is in a range from 0 to 10, for example, from 0 to 5. When i is 0, $R^7$ is linked to the silicon atom by its oxygen atom, and is linked to the oxygen atom of another moiety (for example, a hydroxyl group) by its carbon atom. $R^9$ and $R^{10}$ may be the same or different, and each $R^9$ and $R^{10}$ is independently $C_{1-20}$ alkyl group or $C_{6-20}$ aryl group. y is a positive integer from 1 to 4,000, for example, a positive integer from 100 to 2,000.

In some embodiments of the present disclosure, the modified or unmodified carbonyl compound moiety $R^5$ is a silicon modified polyester resin moiety represented by Formula (9).

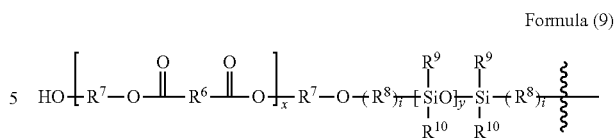

Formula (9)

In Formula (9), $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000. $R^8$ is $C_{1-20}$ alkylene group or $C_{1-20}$ oxyalkylene group. i is in a range from 0 to 10, for example, from 0 to 5. When i is 0, $R^7$ is linked to the silicon atom by its oxygen atom, and is linked to the oxygen atom of another moiety (for example, a hydroxyl group) by its carbon atom. $R^9$ and $R^{10}$ may be the same or different, and each $R^9$ and $R^{10}$ is independently $C_{1-20}$ alkyl group or $C_{6-20}$ aryl group. y is a positive integer from 1 to 4,000, for example, a positive integer from 100 to 2,000.

Additionally, in this embodiment, the polysilsesquioxane polymer modified organic resin has the structure represented by Formula (10).

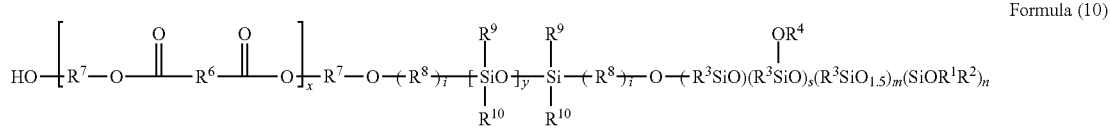

Formula (10)

In Formula (10), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. n is a positive integer from 1 to 200, for example, a positive integer from 20 to 50. m is a positive integer from 10 to 500, for example, a positive integer from 50 to 400. s is an integer from 0 to 250, for example, a integer from 10 to 50. $R^6$ is $C_{1-20}$ alkylene group, $C_{5-20}$ cycloalkylene group, or $C_{5-20}$ arylene group. $R^7$ is $C_{1-20}$ alkylene group, $C_{5-20}$ cycloalkylene group, or $C_{5-20}$ arylene group. x is a positive integer from 10 to 20,000, for example, a positive integer from 100 to 1,000. $R^8$ is $C_{1-20}$ alkylene group or $C_{1-20}$ oxyalkylene group. i is in a range from 0 to 10, for example, from 0 to 5. When i is 0, $R^7$ is linked to the silicon atom by its oxygen atom, and is linked to the oxygen atom of another moiety (for example, a hydroxyl group) by its carbon atom. $R^9$ and $R^{10}$ may be the same or different, and each $R^9$ and $R^{10}$ is independently $C_{1-20}$ alkyl group or $C_{6-20}$ aryl group. y is a positive integer from 1 to 4,000, for example, a positive integer from 100 to 2,000.

In some embodiments of the present disclosure, the modified or unmodified carbonyl compound moiety $R^5$ is a polyurethane resin moiety represented by Formula (11).

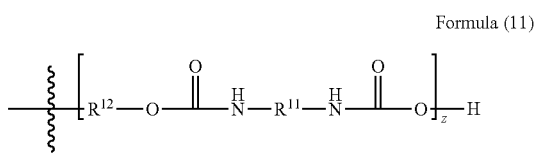

Formula (11)

In Formula (11), $R^{11}$ is $C_{1-20}$ alkylene group, $C_{5-20}$ cycloalkylene group, or $C_{5-20}$ arylene group. $R^{12}$ is $C_{1-20}$ alkylene group, $C_{5-20}$ cycloalkylene group, or $C_{5-20}$ arylene group. z is a positive integer from 10 to 20,000, for example, a positive integer from 100 to 1,000.

Additionally, in this embodiment, the polysilsesquioxane polymer modified organic resin has the structure represented by Formula (12).

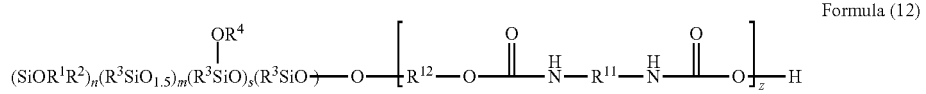

Formula (12)

In Formula (12), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. n is a positive integer from 1 to 200, for example, a positive integer from 20 to 50. m is a positive integer from 10 to 500, for example, a positive integer from 50 to 400. s is an integer from 0 to 250, for example, a integer from 10 to 50. $R^{11}$ is $C_{1-20}$ alkylene group, $C_{5-20}$ cycloalkylene group, or $C_{5-20}$ arylene group. $R^{12}$ is $C_{1-20}$ alkylene group, $C_{5-20}$ cycloalkylene group, or $C_{5-20}$ arylene group. z is a positive integer from 10 to 20,000, for example, a positive integer from 100 to 1,000.

In some embodiments of the present disclosure, the modified or unmodified carbonyl compound moiety $R^5$ is an acrylic resin moiety, which includes a first unit represented by Formula (13), a second unit represented by Formula (14) and a third unit represented by Formula (15). The first unit, the second unit and the third unit are repeated in a random manner or a block manner.

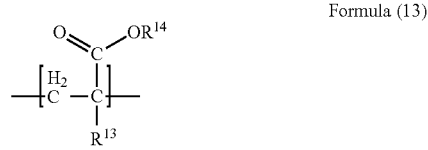

Formula (13)

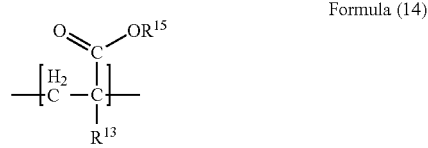

Formula (14)

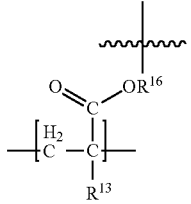

Formula (15)

In Formula (13), Formula (14) and Formula (15), $R^{13}$ is hydrogen, methyl group or ethyl group. $R^{14}$ is $C_{1-20}$ alkyl group, $C_{5-20}$ cycloalkyl group, or $C_{5-20}$ aryl group. $R^{15}$ is hydrogen or $C_{1-20}$ hydroxyalkyl group. $R^{16}$ is $C_{1-20}$ alkylene group, $C_{5-20}$ cycloalkylene group, or $C_{5-20}$ arylene group. The number of the first unit is in a range from 10 to 20,000, for example, from 100 to 1000. The number of the second unit is in a range from 10 to 20,000, for example, from 100 to 1,000. The number of the third unit is 1.

Additionally, in this embodiment, the polysilsesquioxane polymer modified organic resin includes the first unit represented by Formula (13), the second unit represented by Formula (14) and a fourth unit represented by Formula (16). The first unit, the second unit, and the fourth unit are repeated in a random manner or a block manner. The number of the first unit is in a range from 10 to 20,000, for example, from 100 to 1,000. The number of the second unit is in a range from 10 to 20,000, for example, from 100 to 1,000. The number of the fourth unit is 1.

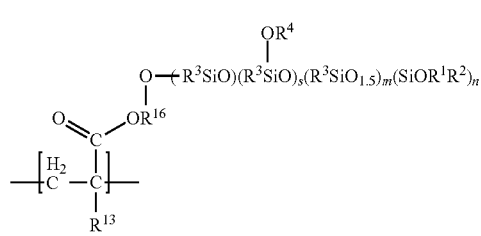

Formula (16)

In Formula (16), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. n is a positive integer from 1 to 200, for example, a positive integer from 20 to 50. m is a positive integer from 10 to 500, for example, a positive integer from 50 to 400. s is an integer from 0 to 250, for example, a integer from 10 to 50. $R^{13}$ is hydrogen, methyl group, or ethyl group. $R^{16}$ is $C_{1-20}$ alkylene group, $C_{5-20}$ cycloalkylene group, or $C_{5-20}$ arylene group.

Moreover, in some embodiments of the present disclosure, the coating composition may further include a dye or a pigment so that the resulting film layer may have a specific color. Furthermore, according to an embodiment of the present disclosure, the pigment may be an inorganic particle with high refractive index (for example, an inorganic particle having a refractive index greater than 2.3), and the particle size may be in a range from 150 to 500 nm or from 200 to 400 nm. As such, the light transmittance of the coating composition can be reduced, such that the film formed by the coating composition appears white. For example, the inorganic material of the inorganic particle may include titanium oxide, silicon dioxide, calcium carbonate, zirconium oxide, aluminum oxide, iron oxide, or a combination thereof.

In some embodiments of the present disclosure, a condensation reaction shown in Reaction Formula (1) may be performed by reacting an organic resin represented by Formula (17) with a polysilsesquioxane polymer represented by Formula (18) to obtain the polysilsesquioxane polymer modified organic resin represented by Formula (1).

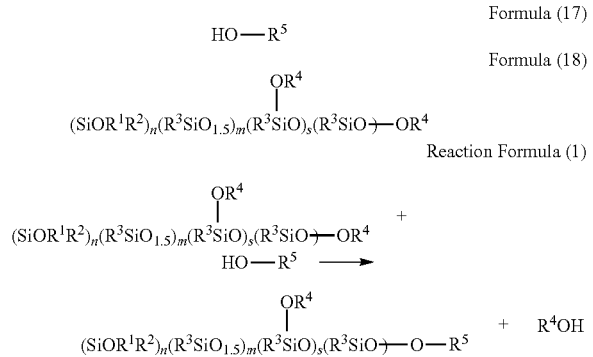

In Formula (17), Formula (18), and Reaction Formula (1), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanatealkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group. $R^5$ is modified or unmodified carbonyl compound moiety. In some embodiments of the present disclosure, $R^5$ includes a polyester resin moiety, a silicon modified polyester resin moiety, a polyurethane resin moiety, or an acrylic resin moiety. n is a positive integer from 1 to 200, for example, a positive integer from 20 to 50. m is a positive integer from 10 to 500, for example, a positive integer from 50 to 400. s is an integer from 0 to 250, for example, a integer from 10 to 50.

In some embodiments of the present disclosure, the organic resin represented by Formula (17) has a hydroxyl group (—OH). In some embodiments of the present disclosure, if the hydroxyl group is covalently bonded to the carbon atom of $R^5$ group, the organic resin has a hydroxyalkyl group such as a hydroxymethyl group ($CH_2OH$ group). In other embodiments of the present disclosure, the hydroxyl group (—OH) of Formula (17) may be replaced by a carboxyl group (—COOH). Furthermore, the polysilsesquioxane polymer represented by Formula (18) has a hydroxyl group or an alkoxy group (—$OR^4$) covalently bonded to the silicon atom. As shown in Reaction Formula (1), the condensation reaction is performed by reacting the hydroxyl group (or methylol group) bonded to the carbon atom in the organic resin represented by Formula (17) with the hydroxyl group or the alkoxyl group bonded to the silicon atom in the polysilsesquioxane polymer represented by Formula (18), and the polysilsesquioxane polymer modified organic resin represented by Formula (1) is formed.

In some embodiments of the present disclosure, in the polysilsesquioxane polymer modified organic resin represented by Formula (1), the carbon atom of the organic resin moiety $R^5$ is linked to a polysilsesquioxane polymer moiety represented by Formula (19) by single oxygen atom.

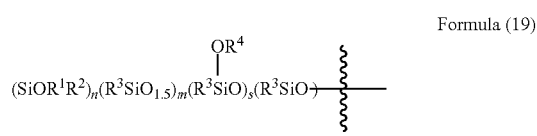

In some embodiments of the present disclosure, the polysilsesquioxane polymer moiety is a random type rather than a cage type or a ladder type.

In some cases, if the polysilsesquioxane polymer moiety is the cage type or ladder type, the polysilsesquioxane polymer moiety will reduce the film formability and flexibility of the coating composition, thereby reducing the applicability of the coating composition.

As noted above, the coating composition of the embodiments of the present disclosure includes the polysilsesquioxane polymer modified organic resin represented by Formula (1), and the polysilsesquioxane polymer moiety is the random type. As such, the film layer formed by the coating composition of embodiments of the present disclosure may possess high weatherability, high mechanical strength and high flexibility. Therefore, the problems of the conventional organic film layer (e.g., poor weatherability and poor mechanical strength) as well as the problems of the conventional inorganic silicon polymer (poor film formability and poor flexibility) can be avoided.

The coating composition of the embodiments of the present disclosure may be applied in an optoelectronic device (e.g., as a substrate or a color filter) or may be used as a coating material (e.g., coated on a surface of the building material such as metal or cement.)

In some embodiments of the present disclosure, a weight average molecular weight (Mw) of the polysilsesquioxane polymer moiety represented by Formula (19) is in a range from about 2,000 to 30,000, for example, about 5,000 to 30,000, or about 10,000.

In some cases, if the weight average molecular weight of the polysilsesquioxane polymer moiety represented by Formula (19) is too low, for example, less than about 2,000, the weatherability of the coating composition cannot be effectively enhanced. However, if the weight average molecular weight of the polysilsesquioxane polymer moiety represented by Formula (19) is too large, for example, greater than about 30,000, the weatherability of the film layer formed by the coating composition may be adversely affected.

In some embodiments of the present disclosure, the polysilsesquioxane polymer modified organic resin represented by Formula (1) may be obtained by the following preparation method. In some embodiments of the present disclosure, (a) about 100 parts by weight of the organic resin represented by Formula (17), (b) about 3-150 parts by weight of the polysilsesquioxane polymer represented by Formula (18), and (c) about 1-10 parts by weight of a catalyst are mixed in (d) about 8-1000 parts by weight of a solvent, and a chemical reaction such as a condensation reaction is performed to obtain the polysilsesquioxane polymer modified organic resin represented by Formula (1). For example, (a) about 100 parts by weight of the organic resin represented by Formula (17), (b) about 5-100 parts by weight of the polysilsesquioxane polymer represented by Formula (18) and (c) about 2-3 parts by weight of the catalyst are mixed in (d) about 150-200 parts by weight of the solvent. Additionally, in some embodiments of the present disclosure, the preparation method further includes mixing the polysilsesquioxane polymer modified organic resin with about 25-200 parts by weight of the dye or pigment.

In some embodiments of the present disclosure, the organic resin may be a modified or unmodified carbonyl compound, for example, a polyester resin moiety, a silicon modified polyester resin moiety, a polyurethane resin moiety, or an acrylic resin moiety. In some embodiments of the present disclosure, the catalyst includes a tin-based catalyst or a titanium-based catalyst. The tin-based catalyst may be, for example, dibutyltin dilaurate, dibutyl tin dioctoate, etc. The titanium-based catalyst may be, for example, tetraisopropyltitanate, tetrabutyl titanate, etc.

In some embodiments of the present disclosure, the solvent may be water, alcohol solvent, ether, ketone, aromatic, alcohol ether solvent, or a combination thereof. The volume of the solvent to be used is not limited, and the above reactants may be dissolved in the solvent.

In some embodiments of the present disclosure, the condensation reaction may be performed at about 40° C. to 200° C. for about 1 to 24 hours, for example, at about 80° C. to 150° C. for about 4 to 5 hours.

In some embodiments of the present disclosure, the polysilsesquioxane polymer represented by Formula (18) may be prepared by the following preparation method. First, a polymerization reaction is performed with a compound represented by Formula (20) to obtain polysilsesquioxane represented by Formula (21).

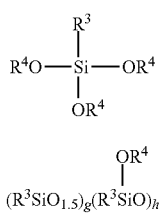

Formula (20)

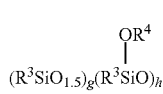

Formula (21)

In Formula (20) and Formula (21), $R^3$ is halide group, $C_{1-8}$ alkyl halide group, $C_{1-8}$ alkoxy group, $C_{1-12}$ alkyl group, or $C_{5-20}$ aromatic ring. $R^4$ is hydrogen or $C_{1-8}$ alkyl group.

In some embodiments of the present disclosure, the compound represented by Formula (20) may be, for example, 3-Chloropropyltrimethoxysilane, methyltrimethoxysilane, methyltriethoxysilane, ethyltriethoxysilane, phenyltriethoxysilane, phenyltrimethoxysilane, tetramethoxysilane, or tetraethoxysilane. In addition, g is a positive integer from 5 to 500, for example, a positive integer from 100 to 250. h is an integer from 0 to 250, for example, an integer from 10 to 50.

Then, the obtained polysilsesquioxane represented by Formula (21) is chemically reacted with a compound represented by Formula (22) to obtain the polysilsesquioxane polymer represented by Formula (18).

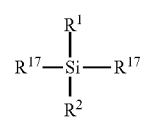

Formula (22)

In Formula (22), $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group. $R^2$ is half oxygen ($O_{1/2}$), hydroxyl group, $C_{1-8}$ alkyl group, or $C_{1-8}$ alkoxy group. $R^{17}$ is independently hydroxy group or $C_{1-8}$ alkoxy group.

In some embodiments of the present disclosure, the compound represented by Formula (22) may be, for example, 2-(3,4-Epoxycyclohexyl)-ethyltrimethoxysilane, 3-Glycidoxypropyltrimethoxysilane, 3-Glycidoxypropyl methyldiethoxysilane, 3-Glycidoxypropyl triethoxysilane, 3-Methacryl oxypropyl methyldimethoxysilane, 3-Methacryloxypropyl trimethoxysilane, 3-Methacryloxypropyl methyldiethoxysilane, 3-Methacryloxypropyl triethoxysilane, N-2-(Aminoethyl)-3-aminopropylmethyldimethoxysilane, N-2-(Aminoethyl)-3-aminopropyltrimethoxysilane, 3-Aminopropyltrimethoxysilane, 3-Aminopropyltriethoxysilane, N-Phenyl-3-aminopropyltrimethoxysilane, 3-Ureidopropyltriethoxysilane, 3-Isocyanatepropyltriethoxysilane, 3-Chloropropyltrimethoxysilane, 1H, 1H,2H,2H-perfluorooctyltriethoxysilane, (Heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, decyltrimethoxysilane, hexyltriethoxysilane, or 3-acryloxypropyl trimethoxysilane.

In some embodiments of the present disclosure, the weight average molecular weight of the polysilsesquioxane polymer represented by Formula (18) obtained by chemically reacting the polysilsesquioxane represented by Formula (21) with the compound represented by Formula (22) is in a range from about 2,000 to 30,000, for example, about 5,000 to 30,000, or about 10,000.

In some cases, if the weight average molecular weight of the polysilsesquioxane polymer moiety represented by Formula (18) is too low, for example, less than about 2,000, the physical properties of the coating composition cannot be significantly enhanced. However, if the weight average molecular weight of the polysilsesquioxane polymer represented by Formula (18) is too large, for example, greater than about 30,000, Reaction Formula (1) cannot be effectively performed, thereby causing poor weatherability of the film layer formed by the coating composition.

Furthermore, in some embodiments of the present disclosure, the char yield of the inorganic content of the polysilsesquioxane polymer represented by Formula (18) is greater than or equal to 50% through analyzed by a thermal gravimetric analyzer (TGA) at 800° C.

According to other embodiments of the present disclosure, a film layer formed by coating and curing the above coating composition is also provided. In some embodiments of the present disclosure, the coating composition may be coated on a substrate, and the coating composition is heated and dried to form the film layer.

This coating method may be wire coating, spin coating, printing coating, or any other suitable coating method. The printing coating may be screen printing, spin coating, bar coating, blade coating, roller coating, dip coating dip coating, spray coating, or brush coating. In addition, the heating time of the heat-drying process may be about 10 minutes to about 2 hours, for example, about 30 minutes to about 1 hour. The heating temperature for the heat-drying process may be about 60° C. to 300° C., for example, about 150° C. to 250° C.

The material of the substrate may be selected from stainless steel, inorganic material such as glass, or organic material such as plastic or synthetic resin. The plastic may be polyethylene terephthalate (PET), polyethylene (PE), polypropylene (PP), polycarbonate (PC), polystyrene (PS), polyacrylonitrile-butadiene-styrene (ABS), or other common plastic. The synthetic resin may be phenolic resin, urea formaldehyde resin, unsaturated polyester resin, melamine resin, polyurethane resin, alkyd resin, epoxy resin, polyvinyl acetate resin, polyacrylate resin, polyvinyl alcohol resin, petroleum resin, polyamine resin, furan resin, or maleic anhydride resin.

In some embodiments of the present disclosure, the thickness of the film layer formed by coating and curing the coating composition may be greater than about 5 microns, for example, greater than about 20 microns.

In some embodiments of the present disclosure, the film layer may be applied in an optoelectronic device (e.g., as a substrate or a color filter), or may be used as a coating material (e.g., coated on a surface of the building material such as metal or cement, or coated on the building facade).

In order to make the above and other purposes, features and advantages of the present disclosure more understandable, the exemplary embodiments and comparative embodiments are provided to illustrate the coating composition and the film layer prepared by the coating composition.

The exemplary embodiments will be described in detail, such that the features of the embodiments of the present disclosure can be easily realized by a person with ordinary skill in the art.

[Preparation of Coating Composition and Film Layer]

Example 1

5 g of HCl, 38.2 g of deionized water, 53 g of tetrahydrofuran (THF), and 51.6 g of methyl trimethoxysilane (MTMS) were uniformly mixed and reacted at 55° C. for 3 hours to obtain a polysilsesquioxane (the weight average molecular weight (Mw) was 4,000) solution. Next, the obtained polysilsesquioxane solution was mixed with 51.6 g of 3-methacryloxy propyl trimethoxysilane (MPMS), and a chemical reaction was performed at 55° C. for 3 hours to obtain a polysilsesquioxane polymer (1). The weight average molecular weight of the polysilsesquioxane polymer (1) was 14988.

Next, 45 g of the polysilsesquioxane polymer (1) was mixed with 105 g of polyester (PE) having a hydroxyl group (available from Royal Gent Industrial Co., Ltd., Model Base 86) and 1.5 g of dibutyltin dilaurate (DBTDL), and reacted at 120° C. for 4 hours to obtain a coating composition containing a polysilsesquioxane polymer modified polyester resin (polysilsesquioxane polymer modified PE or PSQ-PE modified resin). The modification rate of the reaction was 8.89%. Then, the coating composition was coated on a stainless steel plate, and dried at 240° C. for 10 minutes to obtain a film layer (1).

Example 2

5 g of HCl, 38.2 g of deionized water, 53 g of tetrahydrofuran (THF), and 51.6 g of methyl trimethoxysilane (MTMS) were uniformly mixed and reacted at 55° C. for 3 hours to obtain a polysilsesquioxane (the weight average molecular weight (Mw) was 4,000) solution. Next, the obtained polysilsesquioxane solution was mixed with 51.6 g of 3-methacryloxy propyl trimethoxysilane (MPMS), and a chemical reaction was performed at 55° C. for 3 hours to obtain a polysilsesquioxane polymer (1). The weight average molecular weight of the polysilsesquioxane polymer (1) was 14988.

Next, 10 g of the polysilsesquioxane polymer (1, PSQ) was mixed with 20 g of silicon modified polyester (SMP) having a hydroxyl group (available from Royal Gent Industrial Co., Ltd., Model TS-9130, containing titanium catalyst), and reacted at 110° C. for 4 hours to obtain a coating composition including a polysilsesquioxane polymer modified silicon modified polyester resin (polysilsesquioxane polymer modified SMP or PSQ-SMP modified resin). The modification rate of the reaction was 8.72%. After the coating composition was dried at 150, the unreacted SMP and the silsesquioxane polymer (1) were soaked and washed with ethyl acetate, followed by filtration through a funnel, and the residual residue was the polysilsesquioxane polymer modified silicon modified polyester resin (PSQ-SMP) having chemical bond. The FT-IR spectrum of the residue was shown in FIG. 1, and the SMP 1270 cm$^{-1}$ O=C—O absorption peak and the PSQ 1030 cm$^{-1}$ Si—O—Si absorption peak remained after purification, which shows that the modification was certainly completed. Then, the coating composition was coated on a stainless steel plate, and dried at 240° C. for 10 minutes to obtain a film layer (2).

Example 3

5 g of HCl, 38.2 g of deionized water, 53 g of tetrahydrofuran (THF), and 51.6 g of methyl trimethoxysilane (MTMS) were uniformly mixed and reacted at 55° C. for 3 hours to obtain a polysilsesquioxane (the weight average molecular weight (Mw) was 4,000) solution. Next, the obtained polysilsesquioxane solution was mixed with 51.6 g of 3-methacryloxy propyl trimethoxysilane (MPMS), and a chemical reaction was performed at 55° C. for 3 hours to obtain a polysilsesquioxane polymer (2). The weight average molecular weight of the polysilsesquioxane polymer (2) was 9400.

Next, 10 g of the polysilsesquioxane polymer (2) was mixed with 20 g of silicon modified polyester (SMP) having a hydroxyl group (available from Royal Gent Industrial Co., Ltd., Model TS-9130, containing titanium catalyst), and reacted at 110° C. for 4 hours to obtain a coating composition including a polysilsesquioxane polymer modified silicon modified polyester resin (polysilsesquioxane polymer modified SMP or PSQ-SMP modified resin). The modification rate of the reaction was 9.55%. Then, the coating composition was coated on a stainless steel plate, and dried at 240° C. for 10 minutes to obtain a film layer (3).

Example 4

20 g of the polysilsesquioxane polymer (1) was mixed with 10 g of silicon modified polyester (SMP) having a hydroxyl group (available from Royal Gent Industrial Co., Ltd., Model TS-9130, containing titanium catalyst), and reacted at 110° C. for 4 hours to obtain a coating composition including a polysilsesquioxane polymer modified silicon modified polyester resin (polysilsesquioxane polymer modified SMP or PSQ-SMP modified resin). The modification rate of the reaction was 24.38%. Then, the coating composition was coated on a stainless steel plate, and dried at 240° C. for 10 minutes to obtain a film layer (4).

Example 5

10 g of the polysilsesquioxane polymer (1) was mixed with 10 g of silicon modified polyester (SMP) having a hydroxyl group (available from Royal Gent Industrial Co., Ltd., Model TS-9130, containing titanium catalyst), and reacted at 110° C. for 4 hours to obtain a coating composition including a polysilsesquioxane polymer modified silicon modified polyester resin (polysilsesquioxane polymer modified SMP or PSQ-SMP modified resin). The modification rate of the reaction was 13.37%. Then, the coating composition was coated on a stainless steel plate, and dried at 240° C. for 10 minutes to obtain a film layer (5).

Example 6

10 g of the polysilsesquioxane polymer (1) was mixed with 10 g of an acrylic resin (available from Eternal Materials Co., Ltd., Model 7132), 1.5 g of dibutyltin dilaurate (DBTDL) and 10 g of tetrahydrofuran (THF), and reacted at 110° C. for 4 hours to obtain a coating composition including a polysilsesquioxane polymer modified acrylic resin (PSQ-acrylate modified resin). Then, the coating composition was coated on a stainless steel plate, and dried at 150° C. for 30 minutes to obtain a film layer (6).

Comparative Example 1

Polyester (available from Royal Gent Industrial Co., Ltd., Model Base 86) was used as the coating material. The polyester was coated on a substrate, and dried at 240° C. for 10 minutes to obtain a film layer (7).

Comparative Example 2

Silicon modified polyester (available from Royal Gent Industrial Co., Ltd., Model 9130) was used as the coating material. The polyester was coated on a substrate, and dried at 240° C. for 10 minutes to obtain a film layer (8).

Comparative Example 3

5 g of HCl, 38.2 g of deionized water, 53 g of tetrahydrofuran (THF), and 51.6 g of methyl trimethoxysilane (MTMS) were uniformly mixed and reacted at 55° C. for 3 hours to obtain a polysilsesquioxane (the weight average molecular weight (Mw) was 4,000) solution. Next, the obtained polysilsesquioxane solution was mixed with 51.6 g of 3-methacryloxy propyl trimethoxysilane (MPMS), and a chemical reaction was performed at 55° C. for 3 hours to obtain a polysilsesquioxane polymer (1). The weight average molecular weight of the polysilsesquioxane polymer (1) was 14988.

The polysilsesquioxane polymer (1) was used as the coating material. The polysilsesquioxane polymer (1) was coated on a substrate, and dried at 240° C. for 10 minutes to obtain a film layer (9).

Comparative Example 4

5 g of HCl, 38.2 g of deionized water, 53 g of tetrahydrofuran (THF), and 51.6 g of methyl trimethoxysilane (MTMS) were uniformly mixed and reacted at 55° C. for 3 hours to obtain a polysilsesquioxane (the weight average molecular weight (Mw) was 4,000) solution. Then, the obtained polysilsesquioxane solution was mixed with 51.6 g of 3-methacryloxy propyl trimethoxysilane (MPMS), and a chemical reaction was performed at 55° C. for 3 hours, then at 25° C. for 72 hours to obtain a polysilsesquioxane polymer (3). The weight average molecular weight of the polysilsesquioxane polymer (3) was 30623.

Next, 10 g of the polysilsesquioxane polymer (3) was mixed with 20 g of silicon modified polyester (SMP) having a hydroxyl group (available from Royal Gent Industrial Co., Ltd., Model TS-9130, containing titanium catalyst), and reacted at 110° C. for 4 hours to obtain a coating composition including a polysilsesquioxane polymer modified silicon modified polyester resin (polysilsesquioxane polymer modified SMP or PSQ-SMP modified resin). The modification rate of the reaction was less than 5%. Then, the coating composition was coated on a stainless steel plate, and dried at 240° C. for 10 minutes to obtain a film layer (10).

Comparative Example 5

5 g of HCl, 38.2 g of deionized water, 53 g of tetrahydrofuran (THF), and 51.6 g of methyl trimethoxysilane (MTMS) were uniformly mixed and reacted at 55° C. for 1 hour to obtain a polysilsesquioxane solution. Then, the obtained polysilsesquioxane solution was mixed with 51.6 g of 3-methacryloxy propyl trimethoxysilane (MPMS), and a chemical reaction was performed at 55° C. for 1 hour to obtain a polysilsesquioxane polymer (4). Next, 10 g of the polysilsesquioxane polymer (3) was mixed with 20 g of silicon modified polyester (SMP) having a hydroxyl group (available from Royal Gent Industrial Co., Ltd., Model TS-9130, containing titanium catalyst), and reacted at 110° C. for 4 hours. Since the weight average molecular weight of the polysilsesquioxane polymer in this comparative example is less than 2,000, the polysilsesquioxane polymer modified silicon modified polyester resin of this comparative example could be also referred to as low molecular weight polysilsesquioxane polymer modified silicon modified polyester resin (low molecular weight PSQ-SMP modified resin). Then, the coating composition was coated on a stainless steel plate, and dried at 240° C. for 10 minutes to obtain a film layer (11).

Comparative Example 6

An acrylic resin (available from Eternal Materials Co., Ltd., Model 7132) coating composition was coated on a stainless steel plate, and dried at 150° C. for 30 minutes to obtain a film layer (12).

[Property Test]

Whether the film layers (1) to (12) were completely cured or not was observed (determination of film formability). The pencil hardness of the film layers (1) to (12) was evaluated according to the measurement method of ASTM D3363. The weatherability of the film layers (1) to (5) and (7) to (11) was evaluated according to the measurement method of ASTM G154 cycle 2 (the gloss retention of the film layers was measured). The alkali resistance of the film layers (1) to (12) was evaluated according to the measurement method of ASTM D1308. The flexibility of the film layers (1) to (5) and (7) to (11) were evaluated according to the measuring method of CNS 15200-5-1 (meandering 2 mm). The results are shown in Table 1.

TABLE 1

| | Coating material | PSQ content | PSQ molecular weight | pencil hardness | weather-proof 616 hours gloss retention | Alkali resistance test | flexibility test | modification rate |
|---|---|---|---|---|---|---|---|---|
| Example 1 Film layer (1) | PSQ-PE modified resin | 12.50% | 14988 | 3H | 105% | Pass | Pass | 8.89% |
| Example 2 Film layer (2) | PSQ-SMP modified resin | 14.53% | 14988 | H | 88% | Pass | Pass | 8.72% |
| Example 3 Film layer (3) | PSQ-SMP modified resin | 11.88% | 9400 | H | 85.6% | Pass | Pass | 9.55% |
| Example 4 Film layer (4) | PSQ-SMP modified resin | 33.6% | 14988 | 2H | 90% | Pass | Pass | 24.38% |
| Example 5 Film layer (5) | PSQ-SMP modified resin | 20.2% | 14988 | H | 94% | Pass | Pass | 13.37% |
| Example 6 Film layer (6) | PSQ modified acrylic resin | 40% | 14988 | 2H | — | Pass | | — |
| Comparative Example 1 Film layer (7) | polyester resin PE | 0% | — | H | 71% | Pass | Pass | — |
| Comparative Example 2 Film layer (8) | silicon modified resin SMP | 0% | — | H | 72% | Pass | Pass | — |
| Comparative Example 3 Film layer (9) | PSQ inorganic resin | 100% | 14988 | 3H | 100% | Fail | Pass | — |
| Comparative Example 4 Film layer (10) | high molecular weight PSQ-SMP modified resin | 14.51% | 30623 | H | 70% | Pass | Pass | <5% |
| Comparative Example 5 Film layer (11) | low molecular weight PSQ-SMP modified resin | 14.50% | 1800~1900 | H | 71% | Pass | Pass | — |
| Comparative Example 6 Film layer (12) | acrylic resin | 0% | — | <H | — | Pass | | — |

First, it was observed that the film could be formed in all of Examples 1-6 and Comparative Examples 1-6. As shown in Table 1, compared with the film layer formed using organic resin, the hardness and weatherability of the film layer formed using a coating composition that included a polysilsesquioxane polymer modified organic resin in some embodiments of the present disclosure could be improved.

For example, the pencil hardness of the film layer (7) formed by the polyester resin (PE) of Comparative Example 1 was H, and the pencil hardness of the film layer (8) formed by the silicon modified polyester resin (SMP) of Comparative Example 2 was H. In contrast, in Example 1 of the present disclosure, the pencil hardness of the film layer (1) formed by the coating composition including the polysilsesquioxane polymer modified polyester was 3H, which greatly improved the mechanical strength of the film layer. Additionally, Example 6 and Comparative Example 6 showed that that the polysilsesquioxane polymer modified acrylic resin could also improve the pencil hardness of the film layer formed by the coating composition.

Therefore, compared with the film layer formed using the organic resin, the pencil hardness of the film layer formed using the coating composition that included a polysilsesquioxane polymer modified organic resin in some embodiments of the present disclosure could be increased by 1H or more, even by 2H.

Furthermore, as shown in Table 1, all of the film layers (1) to (5) of Examples 1-5 of the present disclosure passed the alkali resistance test and the flexibility test.

As shown in Table 1, the weatherability of the film layers (1) to (5) and (7) to (11) was evaluated according to the measurement method of ASTM G154. After 616 hours of UV irradiation, the gloss retention (105%) of the film layer (1) obtained by the coating composition including the polysilsesquioxane polymer modified polyester resin of Example 1 was higher than the gloss retention (71%) of the film layer (7) obtained by the polyester resin of Comparative Example 1.

In addition, as shown in Table 1, after 616 hours of UV irradiation, the gloss retention (88%) of the film layer (2) obtained by the coating composition including the polysilsesquioxane polymer modified silicon modified polyester resin of Example 2 was higher than the gloss retention (72%) of the film layer (8) obtained by the silicon modified polyester resin of Comparative Example 2. Thus, in the embodiments of the present disclosure, by modifying the organic resin with the polysilsesquioxane polymer, the weatherability of the resulting film layer could be improved.

Furthermore, as shown in Table 1, after 616 hours of UV irradiation, the gloss retention of the film layer (9) obtained by the polysilsesquioxane polymer (2) of Comparative Example 3 was 100%. In contrast, in Example 1 of the present disclosure, the gloss retention of the film layer (1) obtained by the coating composition including the polysilsesquioxane polymer modified polyester resin was 105%. Therefore, the weatherability of the film layer (1) of Example 1 of the present disclosure was superior to the weatherability of the film layer obtained by the polysilsesquioxane polymer.

Moreover, as shown in Table 1, after 616 hours of UV irradiation, the gloss retention of the film layer (10) obtained by the high molecular weight (the weight average molecular weight was 30623) polysilsesquioxane polymer modified polyester resin of Comparative Example 4 was 70%. The gloss retention of the film layer (11) obtained by the low molecular weight (the weight average molecular weight was less than 2,000) polysilsesquioxane polymer modified polyester resin of Comparative Example 5 was 71%. In contrast, the coating composition of Example 2 of the present disclosure includes the polysilsesquioxane polymer modified silicon modified polyester having a weight average molecular weight of 14988, and the gloss retention of the film layer (2) formed by the coating composition was 88%. Furthermore, the gloss retention of the film layers (4) and (5) of Examples 4 and 5 was up to 90% and 94%, respectively.

As noted above, if the weight average molecular weight of the polysilsesquioxane polymer moiety was too large, for example, greater than about 30,000, or the weight average molecular weight was too low, for example, less than about 2,000, the weatherability of the organic resin film layer could not be improved, or was even deteriorated. By comparison, the weight average molecular weight of the polysilsesquioxane polymer of the embodiments of the present disclosure was about 2,000 to about 30,000, which could improve the weatherability of the resulting film layer.

In summary, the film layer formed by the coating composition of embodiments of the present disclosure can possess high weatherability, high mechanical strength and high flexibility. Therefore, the problems of the conventional organic film layer (e.g., poor weatherability and poor mechanical strength) as well as the problems of the conventional inorganic silicon polymer (poor film formability and poor flexibility) can be avoided. The coating composition of the embodiments of the present disclosure can be applied in an optoelectronic device (e.g., as a substrate or a color filter), or can be used as the coating material (e.g., coated on a surface of the building material such as metal or cement, or coated on the building facade).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A coating composition, comprising: a polysilsesquioxane polymer modified organic resin represented by Formula (1):

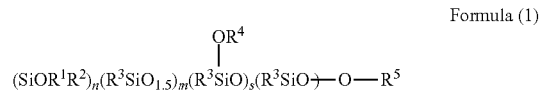

Formula (1)

wherein $R^1$ is $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group; $R^2$ is half oxygen($O_{1/2}$), hydroxyl group, $C_{1-8}$ alkyl group, or $C_{1-8}$ alkoxy group; $R^3$ is halide group, $C_{1-8}$ alkyl halide group, $C_{1-8}$ alkoxy group, $C_{1-12}$ alkyl group, or $C_{5-20}$ aromatic ring; $R^4$ is hydrogen or $C_{1-8}$ alkyl group; $R^5$ is a modified or unmodified carbonyl compound moiety; n is a positive integer from 1 to 200; m is a positive integer from 10 to 500, and s is an integer from 0 to 250.

2. The coating composition as claimed in claim 1, wherein $R^5$ comprises a polyester resin moiety, a silicon modified polyester resin moiety, a polyurethane resin moiety, or an acrylic resin moiety.

3. The coating composition as claimed in claim 2, wherein $R^5$ is the polyester resin moiety represented by Formula (2):

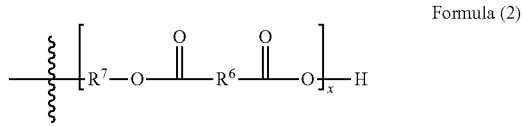

Formula (2)

wherein $R^6$ is $C_{1-20}$ alkylene group, $C_{5-20}$ cycloalkylene group or $C_{5-20}$ arylene group; $R^7$ is $C_{1-20}$ $C_{1-20}$ alkylene group, $C_{5-20}$ cycloalkylene group or $C_{5-20}$ arylene group; and x is a positive integer from 10 to 20,000.

4. The coating composition as claimed in claim 2, wherein $R^5$ is the silicon modified polyester resin moiety represented by Formula (3) or Formula (4):

Formula (3)

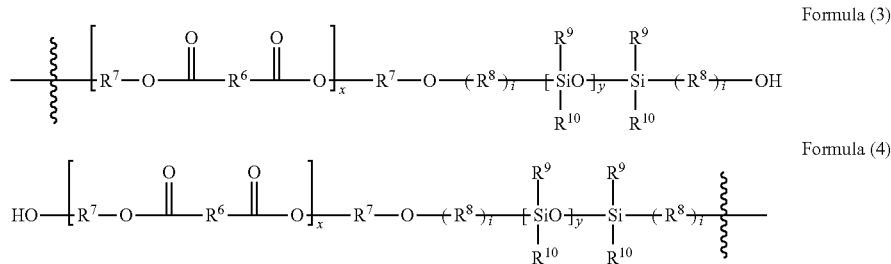

Formula (4)

wherein $R^6$ is $C_{1-20}$ alkylene group, $C_{5-20}$ cycloalkylene group, or $C_{5-20}$ arylene group; $R^7$ is $C_{1-20}$ alkylene group, $C_{5-20}$ cycloalkylene group, or $C_{5-20}$ arylene group; x is a positive integer from 10 to 20,000; $R^8$ is $C_{1-20}$ alkylene group or $C_{1-20}$ oxyalkylene group; i is in a range from 0 to 10; $R^9$ and $R^{10}$ are the same or different, and each $R^9$ and $R^{10}$ is independently $C_{1-20}$ alkyl group or $C_{6-20}$ aryl group; and y is a positive integer from 1 to 4,000.

5. The coating composition as claimed in claim 2, wherein $R^5$ is the polyurethane resin moiety represented by Formula (5):

Formula (5)

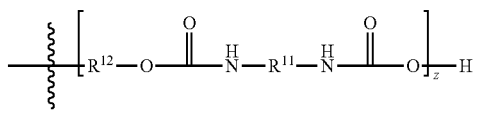

wherein $R^{11}$ is $C_{1-20}$ alkylene group, $C_{5-20}$ cycloalkylene group, or $C_{5-20}$ arylene group; $R^{12}$ is $C_{1-20}$ alkylene group, $C_{5-20}$ cycloalkylene group, or $C_{5-20}$ arylene group; and z is a positive integer from 10 to 20,000.

6. The coating composition as claimed in claim 2, wherein $R^5$ is the acrylic resin moiety, comprising: a first unit represented by Formula (6), a second unit represented by Formula (7) and a third unit represented by Formula (8), and the first unit, the second unit and the third unit are repeated in a random manner or a block manner:

Formula (6)

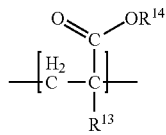

Formula (7)

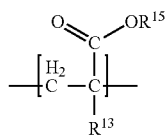

-continued

Formula (8)

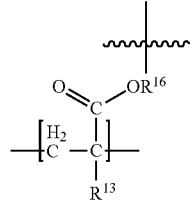

wherein $R^{13}$ is hydrogen, methyl group, or ethyl group; $R^{14}$ is $C_{1-20}$ alkyl group, $C_{5-20}$ cycloalkyl group, or $C_{5-20}$ aryl group; $R^{15}$ is hydrogen or $C_{1-20}$ hydroxyalkyl group; $R^{16}$ is $C_{1-20}$ alkylene group, $C_{5-20}$ cycloalkylene group, or $C_{5-20}$ arylene group; wherein the number of the first unit is in a range from 10 to 20,000; the number of the second unit is in a range from 10 to 20,000; and the number of the third unit is 1.

7. The coating composition as claimed in claim 1, wherein in the polysilsesquioxane polymer modified organic resin, a weight average molecular weight of a polysilsesquioxane polymer moiety represented by Formula (9) is in a range from 2,000 to 30,000:

Formula (9)

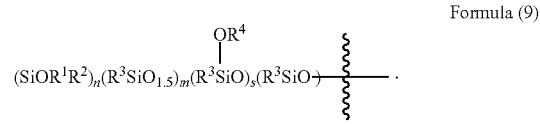

8. A method for preparing a coating composition, comprising:
mixing (a) 100 parts by weight of an organic resin, (b) 3-150 parts by weight of a polysilsesquioxane polymer and (c) 1-10 parts by weight of a catalyst in (d) 8-1000 parts by weight of a solvent, and performing a chemical reaction to obtain a polysilsesquioxane polymer modified organic resin represented by Formula (1), wherein the catalyst comprises a tin-based catalyst or a titanium-based catalyst:

Formula (1)

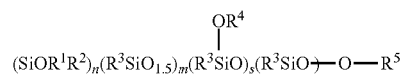

wherein $R^1$ is $C_{3-12}$ epoxy group, $C_{3-12}$ acrylate group, $C_{3-12}$ alkylaryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group; $R^2$ is half oxygen($O_{1/2}$), hydroxyl group, $C_{1-8}$ alkyl group, or $C_{1-8}$ alkoxy group; $R^3$ is halide group, $C_{1-8}$ alkyl halide group, $C_{1-8}$ alkoxy group, $C_{1-12}$ alkyl group, or $C_{5-20}$ aromatic ring; $R^4$ is hydrogen or $C_{1-8}$ alkyl group; $R^5$ is modified or unmodified carbonyl compound moiety; n is a positive integer from 1 to 200; m is a positive integer from 10 to 500, and s is an integer from 0 to 250.

9. The method for preparing the coating composition as claimed in claim 8, wherein the catalyst comprises dibutyltin dilaurate, dibutyl tin dioctoate, tetraisopropyltitanate, or tetrabutyl titanate.

10. The method for preparing the coating composition as claimed in claim 8, wherein $R^5$ comprises a polyester resin moiety, a silicon modified polyester resin moiety, a polyurethane resin moiety, or an acrylic resin moiety.

\* \* \* \* \*